United States Patent
Lin et al.

(10) Patent No.: US 11,412,159 B2
(45) Date of Patent: Aug. 9, 2022

(54) METHOD AND APPARATUS FOR GENERATING THREE-DIMENSIONAL PARTICLE EFFECT, AND ELECTRONIC DEVICE

(71) Applicant: BEIJING MICROLIVE VISION TECHNOLOGY CO., LTD, Beijing (CN)

(72) Inventors: Xin Lin, Beijing (CN); Jing Wang, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/968,239

(22) PCT Filed: Dec. 25, 2018

(86) PCT No.: PCT/CN2018/123644
§ 371 (c)(1),
(2) Date: Aug. 7, 2020

(87) PCT Pub. No.: WO2020/019667
PCT Pub. Date: Jan. 30, 2020

(65) Prior Publication Data
US 2021/0037193 A1    Feb. 4, 2021

(30) Foreign Application Priority Data

Jul. 27, 2018    (CN) .......................... 201810838413.5

(51) Int. Cl.
*G06T 19/00*    (2011.01)
*H04N 5/232*    (2006.01)
*H04N 5/262*    (2006.01)

(52) U.S. Cl.
CPC ......... *H04N 5/2621* (2013.01); *G06T 19/006* (2013.01); *H04N 5/232939* (2018.08); *G06T 2210/56* (2013.01)

(58) Field of Classification Search
CPC ... G06T 2210/56; G06T 13/00; G06T 15/005; G06T 1/20; G06T 2213/12; G06T 2200/24; G06T 13/20; G06T 11/60; G06F 9/485
See application file for complete search history.

(56) References Cited

U.S. PATENT DOCUMENTS 9,607,421 B2    3/2017  Lee et al.
2005/0231512 A1*  10/2005  Niles ..................... G06T 13/00
                                                345/473
(Continued)

FOREIGN PATENT DOCUMENTS

CN    102122245 A    7/2011
CN    102541519 A    7/2012
(Continued)

OTHER PUBLICATIONS

Y. Cao, "Research and Implementation of Real-Time Rendering with a Realistic Universal Particle System", Master Dissertation, University of Electronic Science and Technology of China, Mar. 2011, pp. 1-123 (English Translation) (Year: 2011).*

(Continued)

*Primary Examiner* — Jin Cheng Wang
(74) *Attorney, Agent, or Firm* — BakerHostetler (57) ABSTRACT

Disclosed is a method and apparatus for generating a three-dimensional particle effect, an electronic device and a computer readable storage medium. The method comprises: receiving a three-dimensional particle resource package; parsing a configuration file of the three-dimensional particle resource package; displaying parameter configuration items corresponding to the configuration file on the display appa- (Continued)

ratus, the parameter configuration items at least comprises a three-dimensional particle system parameter configuration item, a three-dimensional particle emitter parameter configuration item, and a three-dimensional particle affector parameter configuration item; receiving a parameter configuration command to perform a parameter configuration for the above parameter configuration items; generating the three-dimensional particle effect according to parameters configured in the parameter configuration items.

20 Claims, 4 Drawing Sheets

(56) References Cited

U.S. PATENT DOCUMENTS

| | | | | |
|---|---|---|---|---|
| 2006/0214935 | A1* | 9/2006 | Boyd | G06F 9/4488 345/473 |
| 2008/0036776 | A1* | 2/2008 | Niles | G06F 3/04847 345/474 |
| 2010/0315410 | A1* | 12/2010 | Zhang | G06T 7/50 345/419 |
| 2016/0035061 | A1* | 2/2016 | Gadre | G06T 19/00 345/473 |
| 2017/0069124 | A1* | 3/2017 | Tong | G06F 16/5854 |
| 2017/0091983 | A1* | 3/2017 | Sebastian | G06T 15/205 |
| 2017/0206694 | A1* | 7/2017 | Jiao | G06T 7/246 |
| 2018/0342041 | A1* | 11/2018 | Ma | G06T 11/00 |
| 2019/0132642 | A1* | 5/2019 | Wang | G06T 11/203 |

FOREIGN PATENT DOCUMENTS

| | | | |
|---|---|---|---|
| CN | 103455968 | A | 12/2013 |
| CN | 104808975 | A | 7/2015 |
| CN | 106126229 | A | 11/2016 |
| CN | 106503188 | A | 3/2017 |
| CN | 106971413 | A | 7/2017 |
| CN | 107895394 | A | 4/2018 |
| CN | 108933895 | A | 12/2018 |

OTHER PUBLICATIONS

"Particle Design 2.0 User Guide", at web.archive/org/web/20170507142825/https://www.71sqaured.com/particledesign/manual, May 5, 2017, pp. 1-18 (Year: 2017).*

International Patent Application No. PCT/CN2018/123644; Int'l Search Report; dated May 8, 2019; 3 pages.

Cao et al.; "Real-time Rendering Research and Implementation of Realistic Universal Particle System"; University of Electronic Science and Technology of China; Master Dissertation; Dec. 2011; 73 pages; English Abstract on pp. 5 and 6.

* cited by examiner

METHOD AND APPARATUS FOR GENERATING THREE-DIMENSIONAL PARTICLE EFFECT, AND ELECTRONIC DEVICE

CROSS REFERENCE TO RELATED APPLICATION

The present application is the national phase application of International Patent Application No. PCT/CN2018/123644, filed on Dec. 25, 2018, which claims priority to Chinese Patent Application No. 201810838413.5, titled "METHOD AND APPARATUS FOR GENERATING THREE-DIMENSIONAL PARTICLE EFFECT, AND ELECTRONIC DEVICE", filed on Jul. 27, 2018 with the Chinese Patent Office, all of which are incorporated herein by reference in their entireties.

FIELD

The present disclosure relates to the technical field of image, and in particular to a method and apparatus for generating a three-dimensional particle, a hardware apparatus and a computer readable storage medium.

BACKGROUND

With the development of computer technology, the application range of smart terminals has been widely expanded, for example, listening to music, playing games, chatting on the Internet, and taking pictures through smart terminals. For the photographing technology of the smart terminal, its photo taking pixel has reached more than 10 million pixels, with high definition and comparable to the photo taking effect of professional cameras.

At present, when using a smart terminal to take a picture or take a video, not only can the built-in photographing software at the factory be used to realize the photographing and video effects of traditional functions, but also can the application (referred to as: APP) be downloaded from the network to realize the photographing effect or video effect with additional functions.

The current APPs for special effects production are pre-made with some effects, which cannot be edited flexibly, and the effects can only be fixed at a fixed position of the image.

SUMMARY OF THE APPLICATION

According to an aspect of the disclosure, the disclosure provides a method for generating a three-dimensional particle effect comprising: receiving a three-dimensional particle resource package; parsing a configuration file of the three-dimensional particle resource package; displaying parameter configuration items corresponding to the configuration file on the display apparatus, the parameter configuration item at least comprises a three-dimensional particle system parameter configuration item, a three-dimensional particle emitter parameter configuration item, and a three-dimensional particle affector parameter configuration item; receiving a parameter configuration command to perform parameter configuration for the above parameter configuration items; generating the three-dimensional particle effect according to the parameters configured in the parameter configuration items.

Optionally, the receiving a parameter configuration command to perform parameter configuration for the above parameter configuration items comprises performing parameter configuration for the three-dimensional particle system parameter configuration items, comprising: configuring a name of the three-dimensional particle; configuring a material of the three-dimensional particle; configuring the number of the three-dimensional particle; and configuring one or more of rendering ways for the three-dimensional particle.

Optionally, the receiving a parameter configuration command to perform parameter configuration for the above parameter configuration items comprises performing parameter configuration for the three-dimensional particle emitter parameter configuration items, comprising: configuring a type of the emitter; configuring a position of the emitter; and configuring one or more of initial states of the three-dimensional particle.

Optionally, the receiving a parameter configuration command to perform a parameter configuration for the above parameter configuration items comprises performing parameter configuration for the three-dimensional particle affector parameter configuration items, comprising: configuring a type of a three-dimensional particle affector; configuring an influence parameter corresponding to the type of the three-dimensional particle affector according to the type of the three-dimensional particle affector.

Optionally, the configuring a type of the three-dimensional particle affector comprises: selecting a plurality of three-dimensional particle affectors; the configuring an influence parameter corresponding to the type of the three-dimensional particle affector according to the type of the three-dimensional particle affector comprises: configuring an influence parameter for each of the types of the selected three-dimensional particle affectors.

Optionally, after generating the three-dimensional particle effect according to parameters configured in the parameter configuration items, the method further comprises: displaying a preview of the three-dimensional particle effect on a display apparatus.

Optionally, the generating the three-dimensional particle effect according to parameters configured in the parameter configuration items comprises: obtaining a first image captured by an image sensor, and generating the three-dimensional particle effect on the first image according to parameters configured in parameter configuration items.

According to another aspect of the disclosure, the disclosure provides an apparatus for generating a three-dimensional particle effect comprising: a receiving module for receiving a three-dimensional particle resource package; a parsing module for parsing a configuration file of the three-dimensional particle resource package; a configuration item displaying module for displaying parameter configuration items corresponding to the configuration file on the display apparatus, the parameter configuration items at least comprising a three-dimensional particle system parameter configuration item, a three-dimensional particle emitter parameter configuration item, and a three-dimensional particle affector parameter configuration item; a parameter configuration command receiving module for receiving a parameter configuration command to perform parameter configuration for the above parameter configuration items; a three-dimensional particle effect generation module for generating the three-dimensional particle effect according to at least one of parameters configured in the parameter configuration items.

Optionally, the parameter configuration command receiving module is used for performing a parameter configuration for the three-dimensional particle system parameter configuration items, comprising: configuring a name of the three-dimensional particle; configuring a material of the three-dimensional particle; configuring the number of the three-dimensional particle; and configuring one or more of rendering ways for the three-dimensional particle.

Optionally, the parameter configuration command receiving module is used for performing parameter configuration for the three-dimensional particle emitter parameter configuration items, comprising: configuring a type of the emitter; configuring a position of the emitter; and configuring one or more of initial states of the three-dimensional particle.

Optionally, the parameter configuration command receiving module is used for performing a parameter configuration for the three-dimensional particle affector parameter configuration items, comprising: configuring a type of a three-dimensional particle affector; configuring an influence parameter corresponding to the type of the three-dimensional particle affector according to the type of the three-dimensional particle affector.

Optionally, the configuring a type of the three-dimensional particle affector comprises: selecting a type of a plurality of three-dimensional particle affectors; the configuring an influence parameter corresponding to the type of the three-dimensional particle affector according to the type of the three-dimensional particle affector comprises: configuring an influence parameter for each of the types of the selected three-dimensional particle affectors.

Optionally, the apparatus for generating three-dimensional particle effect further comprises: a preview displaying module for displaying a preview of the three-dimensional particle effect on a display apparatus.

Optionally, the three-dimensional particle effect generation module is used for obtaining a first image captured by an image sensor, and generating the three-dimensional particle effect on the first image according to parameters configured in parameter configuration items.

According to still another aspect of the disclosure, the disclosure provides an electronic device comprising: a memory for storing a non-transitory computer readable instruction; and a processor for executing the computer readable instruction such that the processor, when executed, implements the steps of any one of the methods described above.

According to still another aspect of the disclosure, the disclosure provides a computer readable storage medium for storing a non-transitory computer readable instruction; when the non-transitory computer readable instructions are executed by a computer, the computer is enabled to execute the steps of any one of the methods described above.

The present disclosure provide a method and apparatus for generating a three-dimensional particle effect, an electronic device and a computer readable storage medium in the embodiment. The method comprises: receiving a three-dimensional particle resource package; parsing a configuration file of the three-dimensional particle resource package; displaying parameter configuration items corresponding to the configuration file on the display apparatus, the parameter configuration items at least comprise a three-dimensional particle system parameter configuration item, a three-dimensional particle emitter parameter configuration item, and a three-dimensional particle affector parameter configuration item; receiving a parameter configuration command to perform parameter configuration for the above parameter configuration items; generating the three-dimensional particle effect according to parameters configured in the parameter configuration items. The three-dimensional particle effect parameter configuration operation allows users to easily configure and edit three-dimensional particle effects, and generate the three-dimensional particle effects on real-time captured image by using the three-dimensional particle effect parameters, so that the difficulty and time in editing the three-dimensional particle effect can be greatly reduced.

The above description is only an overview of the technical solutions of the disclosure. In order to more clearly understand the technical means of the disclosure, which can be implemented in accordance with the contents of the specification, and to make the above and other objects, features and advantages of the disclosure become more apparent and obvious, hereinafter, preferred embodiments will be described in detail with reference to the accompanying drawings.

DETAILED DESCRIPTION OF THE PREFERRED EXAMPLES

Through specific examples of the disclosure below, technicians of the field can easily understand other advantages and efficacies of the disclosure revealed by the specification obviously, the described embodiments are only a part of the embodiments of the present disclosure, rather than all embodiments. The disclosure can also be implemented or applied through other different ways, and the details of the specification can also be modified or changed based on different views and applications without deviating from the spirit of the disclosure. It should be noted that, in the case of no conflicts, the following embodiments and features in the embodiments can be combined mutually. Based on the embodiments of the present disclosure, all the other embodiments obtained by those of ordinary skill in the art without inventive effort are within the scope of the present disclosure.

It is to be noted that various aspects of the embodiments within the scope of the appended claims are described below. It should be apparent that the aspects described herein may be embodied in a wide variety of forms, and any specific structure and/or function described herein is merely illustrative. Based on the disclosure, those skilled in the art will appreciate that one aspect described herein can be implemented independently of any other aspects and that two or more of these aspects can be combined in various ways. For example, the device and/or method can be implemented and/or practiced using any number of the aspects set forth herein. In addition, the device and/or the method may be implemented and/or practiced using other structures and/or functionalities than one or more of the aspects set forth herein.

It should be noted that, the diagrams provided in the following embodiments only illustrate the basic conceptions of the disclosure in a schematic way, thus only components relative to the disclosure are shown instead of drawing the number of components, shape and scale in actual implementation, in which the type, the number and proportion of each group can be a kind of random change, and its component, layout type may also be more complex.

In addition, in the following description, specific details are provided to facilitate a thorough understanding of the examples. However, those skilled in the art will appreciate that the aspects can be practiced without these specific details.

Figure 1:
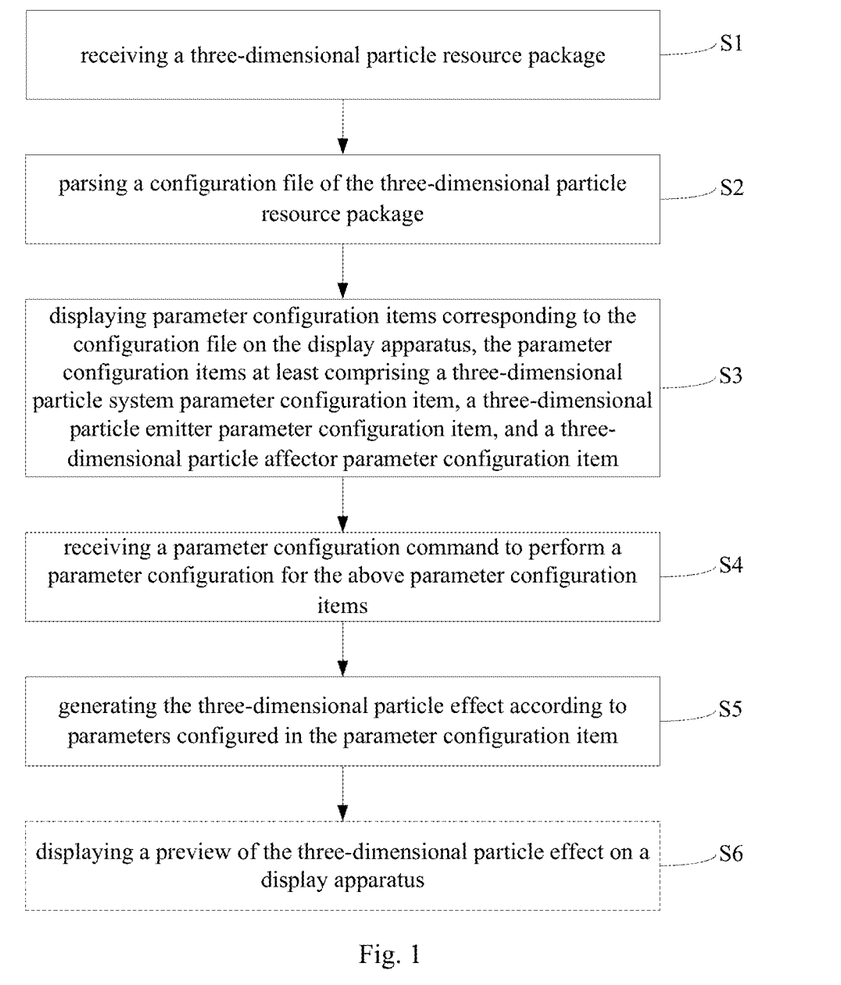
FIG. 1 is a flow chart of a method for generating a three-dimensional particle effect according to an embodiment of the disclosure.

In order to solve the technical problem of how to improve the user experience, the embodiment of the disclosure provides a method for generating a three-dimensional particle effect. As shown in FIG. 1, the method for generating a three-dimensional particle effect mainly comprises the following steps S1 to S5. Among which:

In the step S1: receiving a three-dimensional particle resource package.

In this embodiment, the three-dimensional particle resource package may be a prepared three-dimensional particle resource package or a semi-finished product of three-dimensional particles, or a newly created three-dimensional particle. If what is received is the prepared three-dimensional particle resource package, the resource package may be directly edited; If what is received is the semi-finished product or the newly created three-dimensional particle, the resource required for the three-dimensional particle may be continuously received or edited. Typical three-dimensional particle resources are three-dimensional particle stickers, material files, audio files, and the like, which are not specifically limited herein, and any resources that may be used to generate three-dimensional particles may be incorporated into the disclosure.

In the step S2: parsing a configuration file of the three-dimensional particle resource package.

In the embodiment, when the resource package of the three-dimensional particle is received, the system parses configuration files of the three-dimensional particle resource package, wherein the configuration files are files for defining the three-dimensional particle effect, and in the configuration files, attribute parameters of the three-dimensional particle effect are recorded, and the configuration files may include default parameters to generate a default three-dimensional particle effect.

In the step S3: displaying parameter configuration items corresponding to the configuration file on the display apparatus, the parameter configuration items at least comprising a three-dimensional particle system parameter configuration item, a three-dimensional particle emitter parameter configuration item, and a three-dimensional particle affector parameter configuration item.

In this embodiment, parameter configuration items corresponding to the configuration file are displayed on the display apparatus of the terminal device, and in this disclosure, the parameter configuration items at least comprise three-dimensional particle system parameter configuration items; in the configuration items, some basic attributes of the three-dimensional particle system, Typical such as a name of the three-dimensional particle, a material of the three-dimensional particle, the number of the three-dimensional particle, a rendering way of the three-dimensional particle, etc. It should be noted that since the configuration items have default values, not every parameter configuration item needs to be configured, and one or more of them may be selected for configuration. In above parameter configuration items, the name of the three-dimensional particle and the number of the three-dimensional particle are easy to understand and will not be elaborated.

For the material of the three-dimensional particle, the existing materials may be directly received, or new materials may be created and a material parameter configuration may be performed for the custom materials. The parameter of the material comprises a rendering and blending mode, whether to enable depth testing, whether to perform depth writing, and whether to perform eliminating one or more of parameters. The parameter of the material further comprises a reflectivity for the RGB component of the body surface to the color light incident on the surface, specifically comprising reflection degree for different light, different color components of ambient light, diffuse light, specular light, and self-illumination. Specifically, the rendering and blending refers to blending two colors together, specifically in this disclosure, referring to blending the color of a pixel location with the color that will be drawn for achieving a special effect. The rendering and blending mode refers to a method for blending, and in general, the blending method is to calculate the source color and the target color to obtain a mixed color. In practical applications, the result obtained by multiplying the source color by a source factor and the result obtained by multiplying the target color by a target factor are often calculated to obtain the mixed color. For example, the calculation is an addition, then it is assumed that the four components of the source color (referred to as red, green, blue, and alpha values) are (Rs, Gs, Bs, As), and the four components of the target color are (Rd, Gd, Bd, Ad), and it is further assumed that the source factors are (Sr, Sg, Sb, Sa) and the target factors are (Dr, Dg, Db, Da), then the new color generated by blending may be represented as (Rs*Sr+Rd*Dr, Gs*Sg+Gd*Dg, Bs*Sb+Bd*Db, As*Sa+Ad*Da), wherein the alpha value represents transparency, and $0 \leq alpha \leq 1$. The above blending method is only an example. In practical applications, the blending mode may be defined or selected by oneself. The calculation may be addition, subtraction, multiplication, division, taking the larger of the two, taking the smaller of the two, logical operations (and, or, XOR, etc.). The depth testing refers to setting a depth buffer zone storing a depth information of a pixel corresponding to a color buffer zone storing a color information of a pixel, first comparing a depth value of the corresponding pixel on the surface with a value stored in the depth buffer zone when deciding whether to draw the surface of an object, then discarding the part if the depth value is larger than or equal to the value in the depth buffer zone, and otherwise using the depth value and the color value corresponding to this pixel to update the depth buffer zone and the color buffer zone respectively. This process is referred to as Depth Testing. Before a scene is drawn, the depth buffer zone is cleared when the color buffer zone is cleared; the value of the depth buffer zone is set to 1 when the depth buffer zone is cleared, indicating a maximum depth value with a range of [0, 1], wherein a smaller value means closer to the observer, and a larger value means farther away from the observer. When the depth testing is performed, a comparison function may be further set for the depth testing, and there are some typical functions as follows: DF_ ALWAYS, which means always passing the test, so that the results obtained here are same as those when the depth testing is not enabled, and the depth buffer zone and color buffer zone are always updated with the depth and color values of the current pixel; DF NEVER, which means never passing the test, so that the values of the depth buffer zone and the color buffer zone are remained still, that is, any pixel points may not be drawn on the screen; DF_ LESS, which means passing the test when the current depth value is smaller than the stored depth value; DF_ EQUAL, which means passing the test when the current depth value is equal to the stored depth value; DF LEQUAL, which means passing the test when the current depth value is smaller than or equal to the stored depth value; DF GREATER, which means passing the test when the current depth value is larger than the stored depth value; DF NOTEQUAL, which means passing the test when the current depth value is not equal to the stored depth value; DF GEQUAL, which means passing the test when the current depth value is larger than or equal to the stored depth value. The depth writing is associated with the depth testing, and in general, if the depth testing is enabled and the result of the depth testing is likely to update the value of the depth buffer zone, the depth writing is required to be enabled to update the value of the depth buffer zone. The eliminating means that in a three-dimensional space, although a polygon has two faces, we may not see those polygons on the back, and some polygons are frontal but are obscured by other polygons. Treating invisible polygons and visible polygons equally will undoubtedly reduce the efficiency of our graphical treatment. At this time, unnecessary surfaces may be eliminated. When the eliminating is enabled, the surface required to be eliminated may be set, for example, setting to eliminate the back surface and/or the front surface. In this embodiment, the reflectivity of the material for various lights may be further set, wherein the reflectivity may be set for the color component of each light. For example, for the ambient light having color components of red, yellow and blue, the reflectivity may be set for the red as 0.5, for the yellow as 0.1, and for the blue as 0.2. In this way, when ambient light is configured, the surface of the three-dimensional particle presents a color and gloss that shows the reflective properties of the material for different lights.

The configuring a map parameter of the three-dimensional particle specifically comprises: obtaining a texture of the map; configuring a wrapping mode of the texture. In the present embodiment, first, a texture representing the map is required to be obtained by typically using an importing method to receive the texture of the map; then, a wrapping mode of the texture may be configured, the wrapping mode refers to how to treat the texture when the three-dimensional particle is larger than the texture of the map, wherein the simplest method is REPEAT mode, which repeats the texture of the map until the three-dimensional particle is entirely covered by the texture of the map and is a commonly-used mode, and another mode is CLAMP interception mode, which uses the color at the edge of the texture of the map for covering the part of the three-dimensional particle that cannot be covered by the texture of the map.

The rendering way for three-dimensional particles comprises a quadrilateral rendering way and a trailing rendering way, wherein the quadrilateral rendering way refers to drawing a quadrilateral, wherein a picture is needed when in drawing, and the picture that may be transparent is tiled on the quadrilateral, then the shape ultimately rendered by the particle is determined by the picture. The trailing rendering way is basically the same as the quadrilateral rendering way, but it has a more tailing effect than the quadrilateral rendering way. It is to be understood that the rendering way may comprise other multiple rendering ways, and details are not described herein again.

In the disclosure, the parameter configuration items at least further comprise a three-dimensional particle emitter parameter configuration item, wherein attributes of the three-dimensional particle emitter are configured; the three-dimensional particle emitter is used to define an initial state when the three-dimensional particle is generated, typically such as a type, a position, an orientation of the emitter, whether to enable, or whether the particle follows the movement of a generator; state parameters when the three-dimensional particle is generated comprise a color, an orientation, an emission angle, a transmission frequency, a lifetime, a quality, a velocity, an emission duration, a transmission interval, a length, a width, a height, and the like. Among which, typical types of three-dimensional particle emitter are shown in Table 1 below:

TABLE 1

| type of emitter | description | special parameters to be configured |
|---|---|---|
| PointEmitter | three-dimensional particle emitted at a particular point | coordinates of the specific point are generally the coordinates of the position of the emitter |
| BoxEmitter | three-dimensional particle emitted in a range of Box | length, width, depth of Box |
| CircleEmitter | three-dimensional particle emitted on a circumference | radius of the circle |
| LineEmitter | three-dimensional particle emitted on a straight line | coordinates of start and end of the straight line |
| SphereEmitter | three-dimensional particle emitted on the surface of a sphere | radius of the sphere |

The above examples of types of the emitter are not exhaustive, in fact the user may customize various types of the generator, and the user may write the types of the generator himself and apply them to the embodiments of the disclosure.

Through the above-mentioned parameter configuration items related to the emitter, it is possible to configure the state at the time of generating the three-dimensional particle, such as where it is generated, how much, and how long it lasts, a color, a scale, etc. A basic three-dimensional particle effect may already be generated by the above parameter configuration items.

In the disclosure, the parameter configuration items at least further comprise a three-dimensional particle affector parameter configuration item. Through the affector parameter configuration item, three-dimensional particle effects with more special effects may be configured. Specifically, the three-dimensional particle affector parameter configuration item may comprise a type, a position, an orientation of the affector, and parameter items that are required for each different type of affector configuration. Typical types of three-dimensional particle affector are shown in Table 2 below:

TABLE 2

| types of affector | Description | special parameters to be configured |
|---|---|---|
| ColorAffector | affect the color change of three-dimensional particles in the life cycle | color operator; color table |

TABLE 2-continued

| types of affector | Description | special parameters to be configured |
| --- | --- | --- |
| ScaleAffector | affect the scale change of three-dimensional particles in the life cycle | scaling values for width, height and depth of the three-dimensional particle |
| ScaleVelocityAffector | affect the velocity change of three-dimensional particles in the life cycle | scaling values for velocity of the three-dimensional particle |
| GravityAffector | three-dimensional particles performs centripetal and centrifugal movement around the emitting point during the life cycle | gravity amount: used in combination of quality parameters of three-dimensional particle |
| JetAffector | three-dimensional particle performs even acceleration and deceleration movement in the life cycle | acceleration value |
| LinearForceAffector | three-dimensional particle is affected by the linear force field during the life cycle to change direction | the magnitude of force of the force field; the way the force field affects |
| SineForceAffector | three-dimensional particle is affected by the Sin force field during the life cycle to perform oscillation movement | magnitude of force field; the way the force field affects; minimum value of oscillation amplitude; maximum value of oscillation amplitude |
| VortexAffector | three-dimensional particle performs whirlpool rotation movement around the emitting point during the life cycle | velocity of rotation |
| FlockCenteringAffector | particles interact with each other during the life cycle, which may cause aggregated movement | N/A |
| TextureAnimationAffector | Texture animation affector, which needs a cooperation from the texture; if a 4x4 sequence frame texture is used, the affector may control each particle to play sequence frame animation | playing sequence frame animation sequence frame, the animation interval of each frame, the start identification of sequence frame, the end identification of sequence frame, and whether one frame is randomly selected in the first frame, for each particle |
| TextureRotationAffector | texture rotation affector, which may affect the rotation of the texture in a life cycle | whether to use a fixed rotation rate, the rotation rate, the initial angle when the particle is emitted, for each particle |
| PathFollowerAffector | path following affector, which may control the particle to move on a specified path points | coordinates of the path |
| PlaneColliderAffector | Plane collision affector, which may control the response of the particle colliding with Plane | normal direction of Plane |
| BoxColliderAffector | Box collision affector, which may control the response of the particle colliding with Box | Length, width, and depth of Box; collision inside Box or outside Box |
| SphereColliderAffector | Sphere collision affector, which may control the response of the particle colliding with Sphere | radius of Sphere; collision inside Sphere or outside Sphere |

The parameters in Table 2 above are specified below:

(1) ColorAffector:

Color operator parameter colorOp: "SET" or "MULTIPLY", "SET" means to replace the current color of the three-dimensional particle directly with the predetermined color, and "MULTIPLY" means multiply the current color of the three-dimensional particle by the predetermined color.

Color table, colors: $[[t1,r1,g1,b1,a1], [t2,r2,g2,b2,a2], [t3, r3,g3,b3,a3], [t4,r4,g4,b4,a4], [\ldots tn,m,gn,bn,an]]$, each color table consisting of multiple points, five parameters of each point representing time, R channel, G channel, B channel, and A channel, wherein time is $0 \leq tn \leq 1$, and n is a natural number greater than 1; when $tn=0$, it indicates the moment when the particle is born; when $tn=1$, it indicates the moment when the particle disappears; R, G, and B are color channels, A is a transparency channel, and each channel has a value of 0-255, which may be represented by a number of 0-1, wherein 0 means 0, 1 means 255, and the intermediate values are obtained proportionally. An example of color table is:

[
[0.0, 1.0, 1.0, 1.0, 0.0],
[0.079, 1.0, 0.89, 0.42, 0.15],
[0.108, 0.98, 0.53, 0.24, 0.1],
[0.7, 0.66, 0.44, 1.0, 0.05],
[1.0, 0.51, 0.64, 1.0, 0.0]
]

(2) SaleAffector:
Scaling value of width: scaleX;
Scaling value of height: scaleY;
Scaling value of depth: scaleZ;
when the affector is used, the three dimensions of the three-dimensional particle are respectively added to the scaling values of the three dimensions to obtain the scale after scaling, and the above three scaling values may be negative numbers.

(3) ScaleVelocityAffector:
Scaling value of velocity: scaleVELOCITY;
the velocity of the three-dimensional particle is added to the scaling value of velocity to obtain the velocity after scaling, and the scaling value of velocity may be a negative number.

(4) GravityAffector:
Gravity amount: gravity;
the magnitudes of centripetal force and centrifugal force are calculated in accordance with the mass parameters of the three-dimensional particle, and the motion trajectory is calculated.

(5) JetAffector:
Acceleration value: acceleration;
the three-dimensional particle perform uniform acceleration or deceleration movement according to the acceleration during the life cycle.

(6) LinearForceAffector:
Magnitude of force of force field: forceScalar;
the way the force field affects: application: "AVERAGE" or "ADD", "AVERAGE" means the average of force and direction; it is assumed that the direction of the force field is A, and the direction of the particle at time t0 is V0, then (A+V0)/2 is used to affect the direction of the particles; if the direction at time t1 is V1, then (A+V1)/2 is used to affect the direction of the particles, and so on. "ADD" means that the force is directly applied to the direction, that is, regardless of the direction of the current moment of the particle, the direction of the particle is directly used by the class A.

(7) SineForceAffector:
Magnitude of force of force field: forceScalar;
the way the force field affects: application: "AVERAGE" or "ADD", "AVERAGE" means the average of force and direction, and "ADD" means that force is directly applied to the direction (same as above);
minimum value of oscillation amplitude: frequencyMin;
maximum value of oscillation amplitude: frequencyMax.

(8) VortexAffector:
velocity of rotation: rotationSpeed.

(9) TextureAnimationAffector: playing way of the sequence frame: animationType: "LOOP" or "UP_DOWN" or "RANDOM", which Respectively means that the sequence frame is played in a loop, played from top to bottom, or played randomly.
interval of each frame animation: animationTimeStep:
start identification of the sequence frame: coordsStart, end identification of the sequence frame: coordsEnd, for example, a texture of 4*4 sequence frame has identification of 0-15 from left to right, and from top to bottom;
whether the first frame selects a frame randomly: startRandom: "ture" or "false"; whether the first frame randomly selects a frame, false means starting from the 0th frame, and ture means randomly selecting a frame to start.

(10) TextureRotationAffector:
whether to use a fixed rotation rate: useOwnRotationSpeed: "ture" or "false";
speed of rotation: rotationSpeed;
initial angle when the three-dimensional particle is emitted: rotation.

(11) PathFollowerAffector:

path key points: points: [
[x1, y1, z1],
[x2, y2, z2],
[x3, y3, z3],
......,
[xm, ym, zm]
]

The three-dimensional particles move in the order of the spatial coordinates of the above key points, and m is a natural number greater than zero.

(12) PlaneColliderAffector:
normal direction of plane: normal.

(13) BoxColliderAffector:
width of Box: width;
height of Box: height;
depth of Box: depth;
whether collision occurs inside: innerCollision: "true" or "false".

(14) SphereColliderAffector:
radius of sphere: radius;
whether collision occurs inside: innerCollision: "true" or "false".

The above examples of types of the affector are not exhaustive, in fact the user may customize various types of the affector, and the user may write the types of the affector himself and apply them to the embodiments of the disclosure.

Through the above parameter configuration items related to the affector, it is possible to configure the state after the three-dimensional particle is emitted, for example, to make a trajectory conforming to an affector attribute, etc.; in an embodiment, multiple affectors may be selected at the same time to exert superimposed effects on the three-dimensional particles generated by the same affector to produce the effects.

It is to be understood that the above parameter configuration items are not exhaustive, and other configurable items may be introduced into the embodiment of the disclosure for configuration.

Step S4: receiving a parameter configuration command to perform a parameter configuration for the above parameter configuration items.

In this step, the terminal receives the configuration command input by the user, and performs parameter configuration on the parameter configuration items in step S3. Specifically, the parameters may be received through a human-computer interaction mode such as an input box, a drop-down menu, a selection box, a button, a slide control, and the like, and are not specifically limited herein. In summary, in this step, the terminal receives the parameter input to the parameter configuration items displayed in step S3 through the human-machine interaction interface.

Step S5: generating the three-dimensional particle effect according to parameters configured in the parameter configuration items.

In an embodiment, the parameters received in step S4 are transmitted to various image algorithms that generate three-dimensional particle effects corresponding to the effects based on the parameters.

In an embodiment, after the step S5, the method comprises: displaying a preview of the three-dimensional particle effect on a display apparatus. This step facilitates observing the change of the three-dimensional particle effect after the configuration parameters are changed in real time for the user, and is convenient for the user to modify the three-dimensional particle effect.

The following is an example of a specific three-dimensional particle configuration that demonstrates the particle effects of an aircraft engine jet effect:

```
Name of the three-dimensional particle system: "name": "jet.veparticle",
Material of the three-dimensional particle: "materials": "jetEffect.mtl"
Quota of the three-dimensional particle; "Quota": 500,
Rendering way: "renderer": {
        "Type": "QUAT"
        },
Configuration of emitter: "emitters": [
   {
        point emitter: "type": "POINT",
        name of emitter: "name": "jetEmitter",
        the three-dimensional particle follows the movement of emitter: "keepLocal": true,
        enable emitter: "isEnabled": true,
        color of three-dimensional particle: "color": [1.0, 1.0, 1.0, 1.0],
        position of emitter: "position": [0.0, 0.0, 0.0],
        orientation of emitter: "rotation": [1.0, 0.0, 0.0, 0.0],
        emitting angle of particle: "angle": 0,
        velocity of particle: "velocity": 10,
        emitting frequency of particle: "emissionRate": 0.5,
        life time of particle: "totalTimeToLive": 60,
        width of particle: "Width": 20,
        height of particle: "Height": 20
   }
],
configuration of affector: "affectors": [
   {
   color affector: "type": "COLOR"
   name of affector: "name": "colorAffector",
   color parameters: "colors": [
        [0.0, 1.0, 1.0, 1.0, 0.0],
        [0.079, 1.0, 0.89, 0.42, 0.15],
        [0.108, 0.98, 0.53, 0.24, 0.1],
        [0.7, 0.66, 0.44, 1.0, 0.05],
        [1.0, 0.51, 0.64, 1.0, 0.0]
        ]
   },
   {
   scale affector: "type": "SCALE"
   name of affector: "name": "scaleAffector",
   scaling value of width: "scaleX": 2,
   scaling value of height: "scaleY": 2,
   }
   ]
}
```

In an embodiment, the three-dimensional particle effect is synchronized directly to the first image captured by the image. In the embodiment, the first image acquired by the image sensor, such as a face image or a body image, is preferably acquired, and then the three-dimensional particle effect is generated on the first image according to parameters configured in the parameter configuration items. Optionally, the three-dimensional particle effect may move following the movement of the first image, such as following the movement of a face or a hand. Such movement may be directly changing the position of the emitter, or superimposing the movement trajectory of the first image onto the current motion trajectory of the three-dimensional particle, which are not specifically limited herein.

In the embodiment of the disclosure, the received or newly created three-dimensional particle effect is configured, and then the three-dimensional particle effect based on the configured three-dimensional particle effect parameters is generated, and the three-dimensional particle effect may be generated in real time on the images acquired by the image sensor in real time. In the conventional art, the three-dimensional particle effect may be made by a third party tool, so that the flexibility is insufficient to be unable to configure the effect in real time, and the effect may only be placed in the existed image or video while being unable to generate the three-dimensional particle effect on the face image captured in real time. In the embodiment, through the parameter configuration of the three-dimensional particle effect, the three-dimensional particle effect may be easily configured and edited by a user, and by generating three-dimensional particle effect parameters, the three-dimensional particle effect generation algorithm may generate three-dimensional particle effects on the images acquired in real time using three-dimensional particle effects parameters. Therefore, compared with the prior art, the difficulty in editing and the time for editing of the three-dimensional particle effect are greatly reduced, and the three-dimensional effects may be synchronized with any face images captured in real time, thereby improving the user experience In above description, although the steps in the above method embodiments are described in the order described above, those skilled in that art may appreciate that the steps in the embodiments of the disclosure are not necessarily performed in the above order, and may also be performed in other orders, such as reverse order, parallel, cross, and the like, and on the basis of above steps, those skilled in the art may also add other steps. The manner in which these obvious variations or equivalent substitutions are also included in the scope of the disclosure, which is not described herein.

The followings are embodiments of the apparatus of the disclosure, which may execute the steps implemented by the method embodiments of the disclosure. For ease of explanation, only parts related to the embodiments of the disclosure are shown. For the specific technical details that are not disclosed, please refer to the method embodiments of the disclosure.

Figure 2:
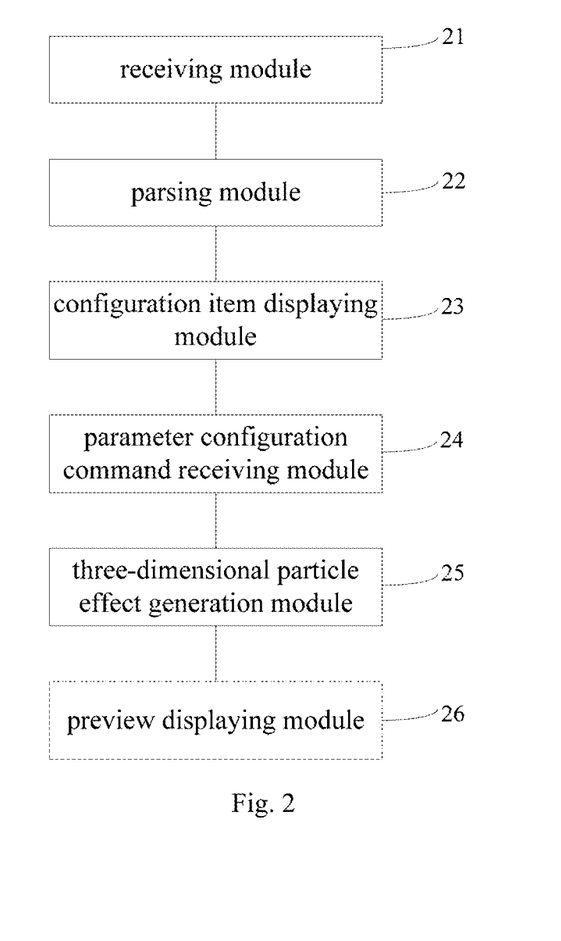
FIG. 2 is a structural view of an apparatus for generating a three-dimensional particle effect according to an embodiment of the disclosure.

Provided is an apparatus for generating a three-dimensional particle effect in the embodiment of the disclosure. The apparatus may execute the steps according to the embodiments of above method for generating a three-dimensional particle effect. As shown in FIG. 2, the apparatus mainly comprises a receiving module 21, a parsing module 22, a configuration item displaying module 23, a parameter configuration command receiving module 24, and a three-dimensional particle effect generation module 25. Among which: the receiving module 21 is used for receiving a three-dimensional particle resource package; the parsing module 22 is used for parsing a configuration file of the three-dimensional particle resource package; the configuration item displaying module 23 is used for displaying parameter configuration items corresponding to the configuration file on the display apparatus, the parameter configuration items at least comprising a three-dimensional particle system parameter configuration item, a three-dimensional particle emitter configuration item, and a three-dimensional particle affector configuration item; the parameter configuration command receiving module 24 is used for receiving a parameter configuration command to perform a parameter configuration for the above parameter configuration items; the three-dimensional particle effect generation module 25 is used for generating the three-dimensional particle effect according to at least one of parameters configured in the parameter configuration items.

In an embodiment, the apparatus for generating three-dimensional particle effect further comprises: a preview displaying module 26 for displaying a preview of the three-dimensional particle effect on a display apparatus.

In an embodiment, the three-dimensional particle effect generation module 25 is used for obtaining a first image captured by an image sensor, and generating the three-dimensional particle effect on the first image according to parameters configured in parameter configuration items.

The above apparatus for generating a three-dimensional particle effect is consistent with the method for generating a three-dimensional particle effect in the embodiment shown in FIG. 1. For details, refer to the foregoing description of the method for generating a three-dimensional particle effect and details are not described herein again.

Figure 3:
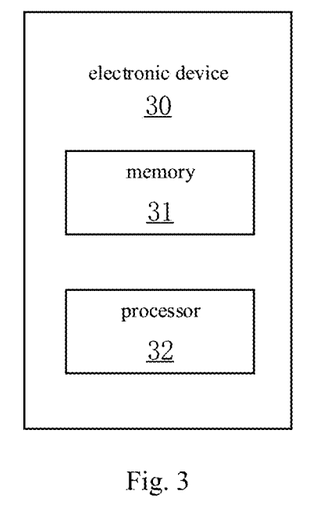
FIG. 3 is a structural view of an electronic device according to an embodiment of the disclosure.

In the embodiment of the disclosure, the received or newly created three-dimensional particle effect is configured, and then the three-dimensional particle effect based on the configured three-dimensional particle effect parameters is generated, and the three-dimensional particle effect may be generated in real time on the images acquired by the image sensor in real time. In the conventional art, the three-dimensional particle effect may be made by a third party tool, so that the flexibility is insufficient to be unable to configure the effect in real time, and the effect may only be placed in the existed image or video while being unable to generate the three-dimensional particle effect on the face image captured in real time. In the embodiment, through the parameter configuration of the three-dimensional particle effect, the three-dimensional particle effect may be easily configured and edited by a user, and by generating three-dimensional particle effect parameters, the three-dimensional particle effect generation algorithm may generate three-dimensional particle effects on the images acquired in real time using three-dimensional particle effects parameters. Therefore, compared with the prior art, the difficulty in editing and the time for editing of the three-dimensional particle effect are greatly reduced, and the three-dimensional effects may be synchronized with any face images captured in real time, thereby improving the user experience FIG. 3 is a block view of an electronic device according to an embodiment of the disclosure. As shown in FIG. 3, the electronic device 30 according to an embodiment of the disclosure comprises a memory 31 and a processor 32.

The memory 31 is used for storing a non-transitory computer readable instruction. Specifically, the memory 31 may comprises one or more computer program products, which may comprise various forms of computer readable storage mediums, such as a volatile memory and/or a non-volatile memory. The volatile memory may comprise, for example, a random access memory (RAM) and/or a cache or the like. The nonvolatile memory may comprise, for example, a read only memory (ROM), a hard disk, a flash memory, or the like.

The processor 32 may be a CPU or other forms of processing units with data processing capabilities and/or instruction execution capabilities, and may control other components in the electronic device 30 to execute desired functions. In an embodiment of the disclosure, the processor 32 is used to execute the computer readable instruction stored in the memory 31 such that the electronic device 30 performs all or part of the steps of the method for generating an effect based on a face of the aforementioned embodiments of the disclosure.

Those skilled in the art may understand that in order to solve the technical problem of how to obtain a good user experience effect, a well-known structure such as a communication bus, an interface, or the like may also be included in the embodiment, and these well-known structures are also intended to be included within the scope of the disclosure.

For a detailed description of the present embodiment, reference may be made to the corresponding description in the foregoing embodiments, and details are not described herein again.

Figure 4:
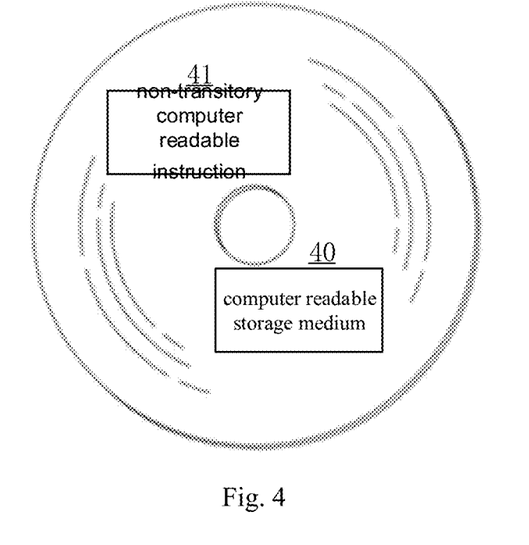
FIG. 4 is a structural view of a computer readable storage medium according to an embodiment of the disclosure.

FIG. 4 is a view of a computer readable storage medium according to an embodiment of the disclosure. As shown in FIG. 4, the computer readable storage medium 40 according to an embodiment of the disclosure stores a non-transitory computer readable instruction 41 thereon. When the non-transitory computer readable instruction 41 is run by the processor, all or part of the steps of the method for generating an effect based on a face of the aforementioned embodiments of the disclosure are performed.

The above computer readable storage medium 40 comprises, but is not limited to an optical storage media (e.g., CD-ROM and DVD), a magneto-optical storage media (e.g., MO), a magnetic storage medium (e.g., a magnetic tape or a removable hard disk), a medium having a built-in rewritable nonvolatile memory (e.g., a memory card), and a medium having a built-in ROM (e.g., a ROM cartridge).

For a detailed description of the present embodiment, reference may be made to the corresponding description in the foregoing embodiments, and details are not described herein again.

Figure 5:
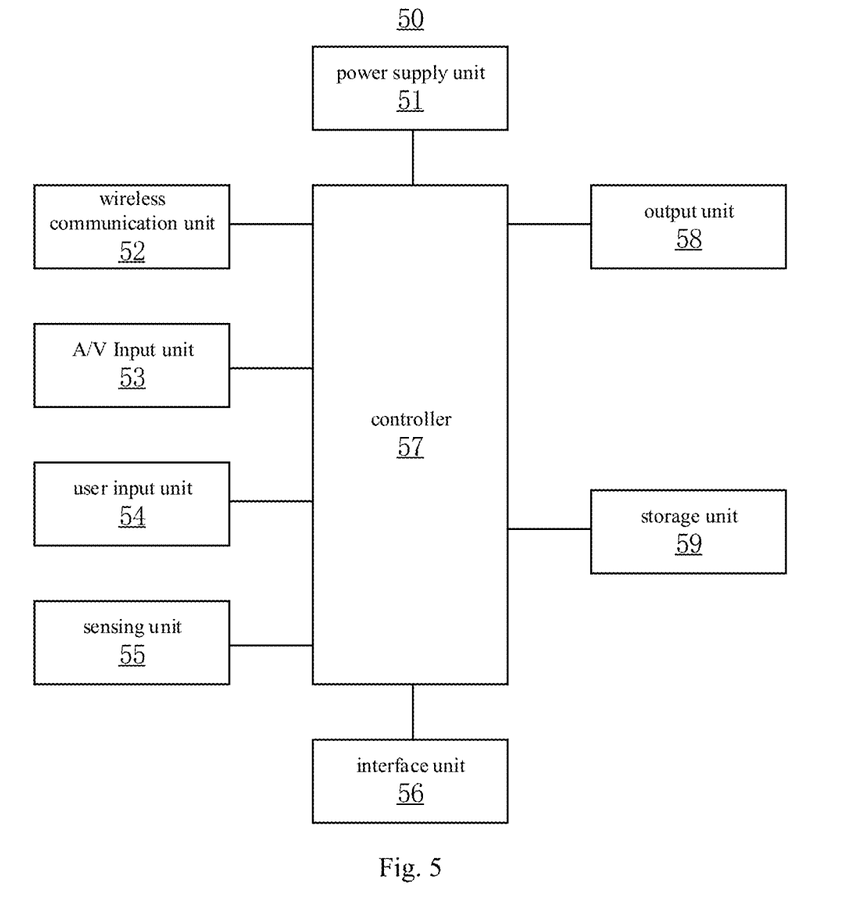
FIG. 5 is a structural view of a terminal for generating a three-dimensional particle effect according to an embodiment of the disclosure.

FIG. 5 is a structural view of hardware of a terminal device according to an embodiment of the disclosure. As shown in FIG. 5, the terminal 50 for generating a three-dimensional particle effect comprises the above embodiments of the apparatus for generating a three-dimensional particle effect.

The terminal device may be implemented in various forms, and the terminal device in the disclosure may comprise but is not limited to the mobile terminal device such as a mobile phones, a smart phone, a laptop, a digital broadcast receivers, PDA (personal digital assistants), a PAD (tablet), a PMP (portable multimedia player), a navigation device, a vehicle terminal device, vehicle display terminal, and onboard electronic rearview mirror, etc., and the fixed terminal device such as a digital TV, a desktop computer, or the like.

As an implementation for equivalent substitution, the terminal may further comprise other components. As shown in FIG. 5, the terminal 50 for generating a three-dimensional particle effect may comprise a power supply unit 51, wireless communication unit 52, an A/V (audio/video) input unit 53, a user input unit 54, a sensing unit 55, an interface unit 56, a controller 57, an output unit 58, a storage unit 59, and the like. FIG. 5 illustrates a terminal having various components, but it should be understood that not all illustrated components may be implemented, and more or fewer components may be implemented instead.

Among which, the wireless communication unit 52 allows for radio communication between terminal 50 and a wireless communication system or network. The A/V input unit 53 is used for receiving an audio or video signal. The user input unit 54 may generate key input data in accordance with a command input by the user to control various operations of the terminal device. The sensing unit 55 detects a current state of the terminal 50, a position of the terminal 50, the presence or absence of a user's touch input to the terminal 50, an orientation of the terminal 50, and an acceleration or a deceleration movement and directions of terminal 50, etc., and generate a command or a signal for controlling the operation of the terminal 50. The interface unit 56 serves as an interface through which at least one external device may be connected to the terminal 50. The output unit 58 is configured to provide an output signal in a visual, audio, and/or tactile manner. The storage unit 59 may store a software program or the like that performs processing and control operations performed by the controller 57, or may temporarily store data that has been output or is to be output. The storage unit 59 may comprise at least one type of storage medium. Moreover, the terminal 50 may cooperate with a network storage apparatus that performs a storage function of the storage unit 59 through a network connection. The controller 57 typically controls the overall operation of the terminal device. Additionally, the controller 57 may comprise a multimedia module for reproducing or playing back multimedia data. The controller 57 may perform a recognition processing in a manner of execution mode to recognize the handwriting input or the picture drawing input performed on the touch screen as a character or an image. The power supply unit 51 receives external power or internal power under the control of the controller 57 and provides appropriate power required to operate the various members and components.

Various implementations for the method for generating a three-dimensional particle effect provided by the disclosure may be implemented in a computer readable medium using, for example, computer software, hardware, or any combination thereof. For implementation by hardware, various implementations for the method for generating a three-dimensional particle effect provided by the disclosure may be implemented by using at least one of an application specific integrated circuit (ASIC), a digital signal processor (DSP), a digital signal processing device (DSPD), programmable logic device (PLD), field programmable gate array (FPGA), a processor, a controller, a microcontroller, a microprocessor, and an electronic unit designed to perform the functions described herein. In some cases, various implementations for the method for generating a three-dimensional particle effect provided by the disclosure may be implemented in the controller 57. For implementation by software, various implementations for the method for generating a three-dimensional particle effect provided by the disclosure may be implemented with separate software modules that allow execution of at least one function or operation. The software code may be implemented by a software application (or program) written in any suitable programming language, which may be stored in storage unit 59 and executed by controller 57.

For a detailed description of the present embodiment, reference may be made to the corresponding description in the foregoing embodiments, and details are not described herein again.

The basic principles of the disclosure have been described above in connection with specific embodiments. However, it should be noted that the advantages, superiority, effects, and the like mentioned in the present disclosure are merely examples and are not to be construed as limiting the benefits, advantages, effects, and the like, which are necessary for the various embodiments of the disclosure. In addition, the specific details of the above disclosure are only for the purpose of illustration and ease of understanding, and the above details are not intended to limit the invention to the specific details described above.

The block views of the devices, apparatuses, equipment, systems of the disclosure are merely illustrative and are not intended to be required or implied, and it is not intended or required to be connected, arranged, or configured in the manner shown in the block views. As will be appreciated by those skilled in the art, these devices, apparatuses, equipment, systems may be connected, arranged, and configured in any manner. Words such as "including", "comprising", "having", and the like, are meant to mean "including but not limited to" and may be used interchangeably. The terms "or" and "and" are used herein to mean the word "and/or" and are used interchangeably unless the context clearly indicates otherwise. The term "such as" as used herein refers to a phrase "such as but not limited to" and is used interchangeably.

In addition, as used herein, an "or" used in the enumeration of items beginning with "at least one" indicates a separate list, so that, for example, the listing of "at least one of A, B, or C" means A or B or C, or AB or AC or BC, or ABC (i.e., A and B and C). Moreover, the wording "exemplary" does not mean that the described examples are preferred or better than the other examples.

It should also be noted that in the systems and methods of the disclosure, various components or steps may be decomposed and/or recombined. These decompositions and/or recombination should be considered as equivalents to the disclosure.

Various changes, substitutions and alterations of the techniques described herein may be made without departing from the teachings of the invention as defined in the appended claims. Further, the scope of the claims of the disclosure is not limited to the specific aspects of the processing, machine, manufacturing, event composition, means, method or action described above. The processing, machine, manufacturing, event composition, means, method or action that currently exists or is to be developed later performing substantially the same function or achieves substantially the same results as the corresponding aspects described herein may be used. Accordingly, the appended claims comprise such processing, machine, manufacturing, event composition, means, method or action within its scope.

The above description of the disclosed aspects is provided to enable those skilled in the art to make or use the disclosure. Various modifications to these aspects are obvious to those skilled in the art, and the general principles defined herein may be applied to other aspects without departing from the scope of the disclosure. Therefore, the disclosure is not intended to be limited to the aspects shown herein, but in the broadest scope of the principles and novel features disclosed herein.

The foregoing description has been presented for purposes of illustration and description. Further, the description is not intended to limit the embodiments of the disclosure to the forms disclosed herein. Although a number of example aspects and embodiments have been discussed above, those skilled in the art will recognize certain variations, modifications, changes, additions and sub-combinations thereof.

What is claimed is:

1. A method for generating a three-dimensional particle effect, comprising:
   receiving a three-dimensional particle resource package;
   parsing a configuration file of the three-dimensional particle resource package;
   displaying parameter configuration items corresponding to the configuration file on the display apparatus, the parameter configuration items at least comprising a three-dimensional particle system parameter configuration item, a three-dimensional particle emitter parameter configuration item, and a three-dimensional particle affector parameter configuration item;
   receiving a parameter configuration command to perform a parameter configuration for the parameter configuration items, wherein the receiving a parameter configuration command to perform a parameter configuration for the parameter configuration items further comprises performing a parameter configuration for a three-dimensional particle and performing a parameter configuration for an emitter associated with the three-dimensional particle;
   generating a three-dimensional particle effect according to parameters configured in the parameter configuration items, wherein the generating a three-dimensional particle effect according to parameters configured in the parameter configuration items further comprises:
   obtaining a first image captured in real time by an image sensor, wherein the first image comprises a body part of a user, and
   generating the three-dimensional particle effect directly on the first image captured in real time according to the parameters configured in the parameter configuration items.

2. The method for generating a three-dimensional particle effect of claim 1, wherein the performing a parameter configuration for a three-dimensional particle further comprises:
   configuring a name of the three-dimensional particle;
   configuring a material of the three-dimensional particle;
   configuring a number of the three-dimensional particle; and
   configuring one or more of rendering ways for the three-dimensional particle.

3. The method for generating a three-dimensional particle effect of claim 1, wherein performing a parameter configuration for an emitter associated with the three-dimensional particle further comprises:
   configuring a type of the emitter;
   configuring a position of the emitter; and
   configuring one or more of initial states of the three-dimensional particle.

4. The method for generating a three-dimensional particle effect of claim 1, wherein the receiving a parameter configuration command to perform a parameter configuration for the above parameter configuration items comprises performing a parameter configuration for the three-dimensional particle affector parameter configuration items, comprising:
   configuring a type of a three-dimensional particle affector;
   configuring an influence parameter corresponding to the type of the three-dimensional particle affector according to the type of the three-dimensional particle affect.

5. The method for generating a three-dimensional particle effect of claim 4, wherein the configuring a type of the three-dimensional particle affector comprises:
   selecting a type of a plurality of three-dimensional particle affectors;
   the configuring an influence parameter corresponding to the type of the three-dimensional particle affector according to the type of the three-dimensional particle affector comprises:
   configuring an influence parameter for each of the types of the selected three-dimensional particle affectors.

6. The method for generating a three-dimensional particle effect of claim 1, wherein after generating the three-dimensional particle effect according to parameters configured in the parameter configuration items, the method further comprises:
   displaying a preview of the three-dimensional particle effect on a display apparatus.

7. The method according to claim 1, wherein the three-dimensional particle effect moves following a movement of the first image.

8. The method according to claim 7, further comprising:
   changing a position of the emitter associated with the three-dimensional particle based on a movement trajectory of the first image.

9. The method according to claim 7, further comprising:
   superimposing a movement trajectory of the first image onto a motion trajectory of the three-dimensional particle.

10. An electronic device, comprising:
at least one processor; and
a memory communicatively connected to the at least one processor; wherein,
the memory stores instructions executable by the at least one processor, and the instructions are executed by the at least one processor to cause the at least one processor to perform operations of:
receiving a three-dimensional particle resource package;
parsing a configuration file of the three-dimensional particle resource package;
displaying parameter configuration items corresponding to the configuration file on the display apparatus, the parameter configuration items at least comprising a three-dimensional particle system parameter configuration item, a three-dimensional particle emitter parameter configuration item, and a three-dimensional particle affector parameter configuration item;
receiving a parameter configuration command to perform a parameter configuration for the parameter configuration items, wherein the receiving a parameter configuration command to perform a parameter configuration for the parameter configuration items further comprises performing a parameter configuration for a three-dimensional particle and performing a parameter configuration for an emitter associated with the three-dimensional particle;
generating a three-dimensional particle effect according to parameters configured in the parameter configuration items, wherein the generating a three-dimensional particle effect according to parameters configured in the parameter configuration items further comprises:
obtaining a first image captured in real time by an image sensor, wherein the first image comprises a body part of a user, and
generating the three-dimensional particle effect directly on the first image captured in real time according to the parameters configured in the parameter configuration items.

11. The device according to claim 10, wherein the performing a parameter configuration for a three-dimensional particle further comprises:
configuring a name of the three-dimensional particle;
configuring a material of the three-dimensional particle;
configuring a number of the three-dimensional particle; and
configuring one or more of rendering ways for the three-dimensional particle.

12. The device according to claim 10, wherein the performing a parameter configuration for an emitter associated with the three-dimensional particle further comprises:
configuring a type of the emitter;
configuring a position of the emitter; and
configuring one or more of initial states of the three-dimensional particle.

13. The device according to claim 10, wherein the receiving a parameter configuration command to perform a parameter configuration for the above parameter configuration items comprises performing a parameter configuration for the three-dimensional particle affector parameter configuration items, comprising:
configuring a type of a three-dimensional particle affector;
configuring an influence parameter corresponding to the type of the three-dimensional particle affector according to the type of the three-dimensional particle affect.

14. The device according to claim 10, wherein the configuring a type of the three-dimensional particle affector comprises:
selecting a type of a plurality of three-dimensional particle affectors;
the configuring an influence parameter corresponding to the type of the three-dimensional particle affector according to the type of the three-dimensional particle affector comprises:
configuring an influence parameter for each of the types of the selected three-dimensional particle affectors.

15. The device according to claim 14, wherein after generating the three-dimensional particle effect according to parameters configured in the parameter configuration items, the operations further comprises:
displaying a preview of the three-dimensional particle effect on a display apparatus.

16. The device according to claim 10, wherein the three-dimensional particle effect moves following a movement of the first image.

17. The device according to claim 16, the operations further comprising:
changing a position of the emitter associated with the three-dimensional particle based on a movement trajectory of the first image.

18. The device according to claim 16, the operations further comprising:
superimposing a movement trajectory of the first image onto a motion trajectory of the three-dimensional particle.

19. A non-transitory computer readable storage medium, wherein the non-transitory computer readable storage medium stores computer instructions for causing a computer to perform operations comprising:
receiving a three-dimensional particle resource package;
parsing a configuration file of the three-dimensional particle resource package;
displaying parameter configuration items corresponding to the configuration file on the display apparatus, the parameter configuration items at least comprising a three-dimensional particle system parameter configuration item, a three-dimensional particle emitter parameter configuration item, and a three-dimensional particle affector parameter configuration item;
receiving a parameter configuration command to perform a parameter configuration for the parameter configuration items, wherein the receiving a parameter configuration command to perform a parameter configuration for the parameter configuration items further comprises performing a parameter configuration for a three-dimensional particle and performing a parameter configuration for an emitter associated with the three-dimensional particle;
generating a three-dimensional particle effect according to parameters configured in the parameter configuration items, wherein the generating a three-dimensional particle effect according to parameters configured in the parameter configuration items further comprises:
obtaining a first image captured in real time by an image sensor, wherein the first image comprises a body part of a user, and
generating the three-dimensional particle effect directly on the first image captured in real time according to the parameters configured in the parameter configuration items.

20. The non-transitory computer readable storage medium of claim 19, the operations further comprising:

changing a position of the emitter associated with the three-dimensional particle based on a movement trajectory of the first image; or superimposing a movement trajectory of the first image onto a motion trajectory of the three-dimensional particle.

* * * * *